Oct. 30, 1934.  G. F. STAMAND  1,978,769
PNEUMATIC BUMPER COVER
Filed June 27, 1933    2 Sheets-Sheet 1

Inventor
G. F. Stamand

By Clarence A. O'Brien
Attorney

Oct. 30, 1934.  G. F. STAMAND  1,978,769
PNEUMATIC BUMPER COVER
Filed June 27, 1933  2 Sheets-Sheet 2

Inventor
G. F. Stamand

By Clarence A. O'Brien
Attorney

Patented Oct. 30, 1934

1,978,769

UNITED STATES PATENT OFFICE 1,978,769

PNEUMATIC BUMPER COVER

George F. Stamand, Stoneham, Mass.

Application June 27, 1933, Serial No. 677,911

1 Claim. (Cl. 293—55)

The present invention relates to a pneumatic bumper cover for automobiles and the like and the prime object of the invention resides in the provision of a cover which may be easily and quickly attached to a conventional bumper and when attached and inflated will tend to absorb shocks particularly such as occur in traffic where the bumper of one automobile will abut the bumper of another automobile as occurs so frequently.

Another very important object of the invention resides in the provision of a pneumatic bumper cover of this nature which is exceedingly simple in its construction, inexpensive to manufacture, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1:
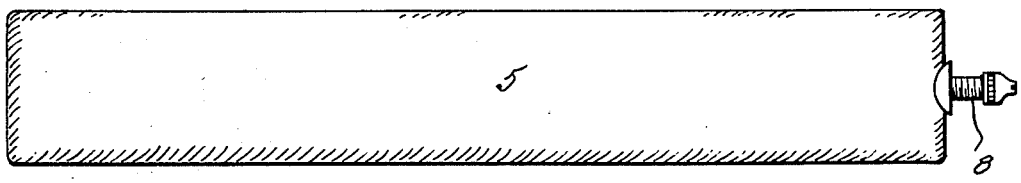
Figure 1 is a front elevation of the cover embodying the features of my invention.
Figure 6:
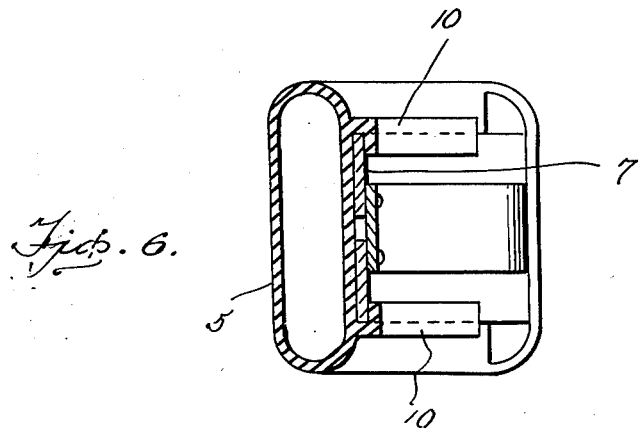
Figure 6 is a vertical transverse section therethrough.
Figure 5:
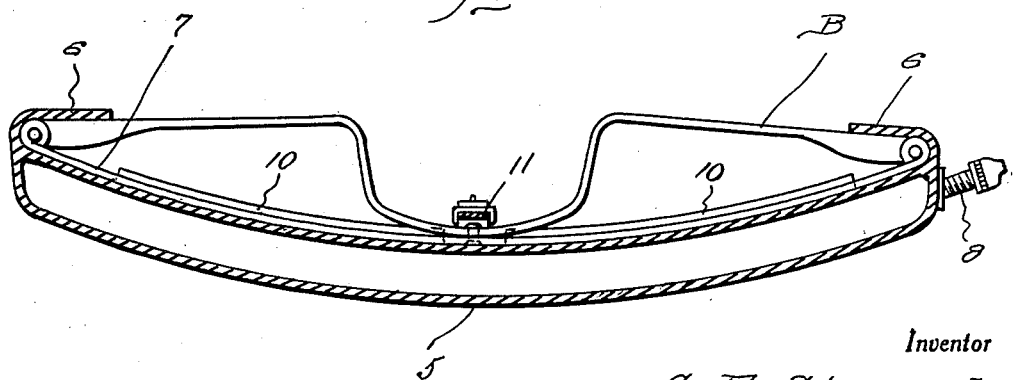
Figure 5 is a longitudinal section through the cover showing the same on a bumper.
Figure 2:
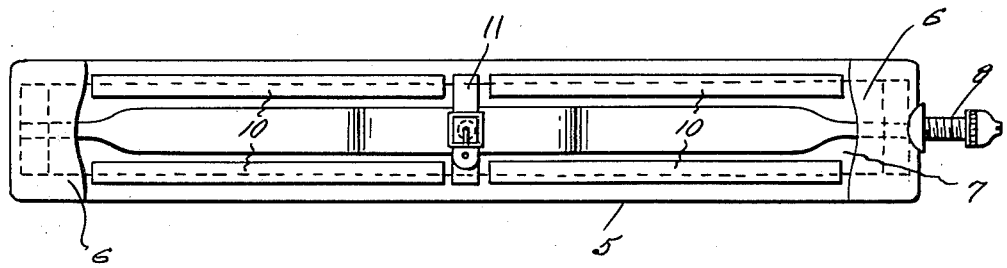
Figure 2 is a rear elevation thereof showing the bumper.
Figure 4:
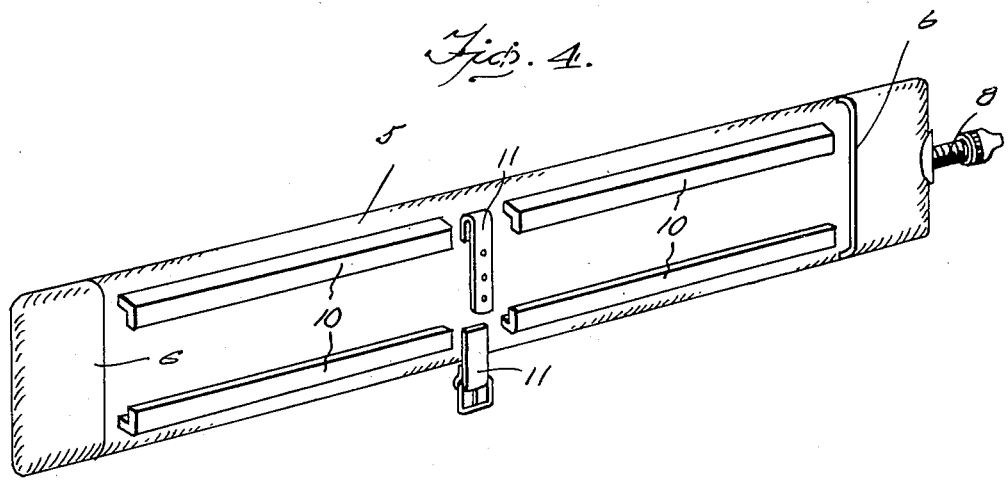
Figure 4 is a perspective view of the cover taken from the rear thereof.
Figure 3:
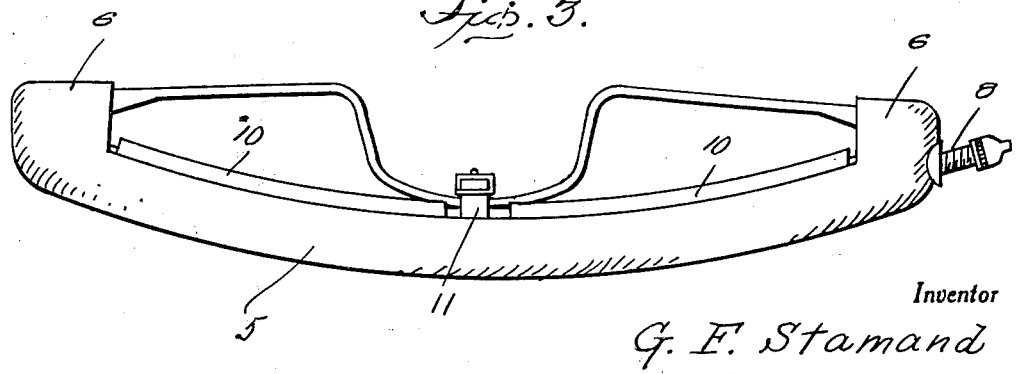
Figure 3 is a top plan view thereof.

Referring to the drawings in detail it will be seen that the numeral 5 denotes an elongated hollow shoe of elastic material such as rubber, rubber composition or the like. On the ends and overlapping the rear of the shoe are pockets 6 for receiving the end portions of a bumper B of conventional formation such as may be found in common use on automobiles. The shoe extends along the front surface of the bumper bar or bars 7. A valve stem 8 of conventional formation such as is used in pneumatic tires is provided at one end of the shoe so that the same may be inflated to the desired pressure. On the rear surface of the shoe 5 are formed angular elongated flaps 10 adapted to engage over the bumper bar or bars 7 of the bumper B as is more clearly illustrated in Figure 6. A pair of straps 11 is connected with the central portion of the rear face of the shoe, one above the other, one strap carrying a buckle for receiving the other strap, and these straps are adapted to be passed around the central part of the bumper, as shown in Figures 2, 3 and 5 to help hold the shoe on the bumper.

It is thought that the construction, utility and advantages of this invention will now be clearly understood by those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A cover for a bumper comprising an elongated pneumatic shoe having its rear face shaped to contact the front face of a bumper with its ends extending slightly beyond the ends of the bumper, pockets formed at the ends of the rear part of the shoe for receiving the ends of the bumper and upper and lower flaps connected with the rear face of the shoe, the shoe, the pockets and the flaps being formed of resilient material, with the flaps and pockets formed integrally with the shoe, each flap being of angle shape in cross section to form a channel, said channels receiving the upper and lower edges of the bumper.

GEORGE F. STAMAND.